(12) United States Patent
Fleischer et al.

(10) Patent No.: US 9,003,160 B2
(45) Date of Patent: Apr. 7, 2015

(54) ACTIVE BUFFERED MEMORY

(75) Inventors: Bruce M. Fleischer, Bedford Hills, NY (US); Thomas W. Fox, Hopewell Junction, NY (US); Hans M. Jacobson, White Plains, NY (US); James A. Kahle, Austin, TX (US); Jaime H. Moreno, Dobbs Ferry, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/566,019

(22) Filed: Aug. 3, 2012

(65) Prior Publication Data

US 2014/0040592 A1    Feb. 6, 2014

(51) Int. Cl.
*G06F 12/10* (2006.01)
*G06F 9/445* (2006.01)

(52) U.S. Cl.
CPC ............ *G06F 9/44578* (2013.01); *G06F 12/10* (2013.01); *Y02B 60/1225* (2013.01)

(58) Field of Classification Search
CPC ......... G06F 12/02; G06F 12/08; G06F 12/10; G06F 2212/7201; G06F 12/109; G06F 12/1027; G06F 3/067; G06F 12/0292
USPC ............................ 711/203, E12.058; 712/205
See application file for complete search history.

(56) References Cited

U.S. PATENT DOCUMENTS

| | | |
|---|---|---|
| 3,287,703 A | 11/1966 | Slotnick |
| 5,437,043 A | 7/1995 | Fujii et al. |
| 5,568,380 A | 10/1996 | Brodnax et al. |
| 5,784,706 A | 7/1998 | Oberlin et al. |
| 5,832,290 A | 11/1998 | Gostin et al. |
| 5,903,769 A | 5/1999 | Arya |
| 5,987,600 A | 11/1999 | Papworth et al. |
| 6,253,287 B1 | 6/2001 | Green |
| 6,785,842 B2 | 8/2004 | Zumkehr et al. |
| 6,839,828 B2 | 1/2005 | Gschwind et al. |
| 6,889,307 B1 | 5/2005 | Scheuerlein |
| 6,950,923 B2 | 9/2005 | O'Connor et al. |
| 7,243,262 B2 | 7/2007 | Mukherjee et al. |
| 7,277,988 B2 | 10/2007 | Gower et al. |
| 7,308,607 B2 | 12/2007 | Reinhardt et al. |
| 7,467,288 B2 | 12/2008 | Glossner, III et al. |

(Continued)

OTHER PUBLICATIONS

"Call Architecture Explained Version 2," retrieved from http://www.blachford.info/computer/Cell/Cell0_v2.html on Jul. 23, 2012; pp. 1-3.

(Continued)

*Primary Examiner* — Jasmine Song
(74) *Attorney, Agent, or Firm* — Cantor Colburn LLP (57) ABSTRACT

According to one embodiment of the present invention, a method for operating a memory device that includes memory and a processing element includes receiving, in the processing element, a command from a requestor, loading, in the processing element, a program based on the command, the program comprising a load instruction loaded from a first memory location in the memory, and performing, by the processing element, the program, the performing including loading data in the processing element from a second memory location in the memory. The method also includes generating, by the processing element, a virtual address of the second memory location based on the load instruction and translating, by the processing element, the virtual address into a real address.

28 Claims, 4 Drawing Sheets

(56) References Cited

U.S. PATENT DOCUMENTS

| | | |
|---|---|---|
| 7,493,516 B2 | 2/2009 | Ferren et al. |
| 7,584,336 B2 | 9/2009 | Tremaine |
| 7,594,055 B2 | 9/2009 | Gower et al. |
| 7,783,860 B2 | 8/2010 | Luick et al. |
| 7,877,582 B2 | 1/2011 | Gschwind et al. |
| 7,908,460 B2 | 3/2011 | Liao et al. |
| 7,949,853 B2 | 5/2011 | Sandon et al. |
| 8,255,745 B2 | 8/2012 | Ferren et al. |
| 8,489,919 B2 | 7/2013 | Clark et al. |
| 2006/0143509 A1* | 6/2006 | Okawa ............... 714/11 |
| 2007/0050661 A1 | 3/2007 | Ferren et al. |
| 2008/0005479 A1 | 1/2008 | Tremaine |
| 2009/0106526 A1 | 4/2009 | Luick et al. |
| 2010/0036994 A1 | 2/2010 | Resnick |
| 2010/0268987 A1 | 10/2010 | Clark et al. |
| 2010/0332764 A1 | 12/2010 | Jouppi |
| 2011/0246828 A1 | 10/2011 | Monchiero et al. |
| 2011/0264858 A1 | 10/2011 | Jeddeloh et al. |
| 2012/0047398 A1 | 2/2012 | Vera et al. |

OTHER PUBLICATIONS

A. Fawibe, et al., "New Memory Organizations for 3D DRAM and PCMs," Archictecture of Computing Systems, ARCS 2012—25th International Conference, Proceedings Publication Date: Feb. 29, 2012; pp. 1-12.

H. P. Hofstee, et al., "Power Efficient Processor Architecture and the Cell Processor," IEEE Computer Society 2005; Proceedings of the 11th Int'l Symposium on High-Performance Computer Architecture; pp. 1-5.

IBM, "Logic on DIMM," ip.com; ip.com No. IPCOM000191776D; Jan. 14, 2010; pp. 1-4.

Wikipedia, "Cell (microprocessor)," retrieved from http://en.wikipedia.org/wiki/Cell_%microprocessor%29 on Jul. 23, 2012; pp. 1-17.

* cited by examiner

ACTIVE BUFFERED MEMORY

BACKGROUND

The present invention relates generally to computer memory, and more particularly to an active buffered memory system.

Computer systems often require a considerable amount of high speed memory, such as random access memory (RAM), to hold information, such as data and programs, when a computer is powered and operational. Memory device densities have continued to grow as computer systems have increased in performance and complexity.

Communication from a main processor to locations on dense memory devices can require additional power due to longer signal paths resulting from the increased density. In addition, increased power consumption within high density memory devices can lead to temperature management issues. Further, data access times and latency associated with data operations are increased while effective bandwidth between the main processor and memory are reduced due to the distance between the processor and memory. The longer signal paths may also allow for more chances for corruption or data errors during data transmission between the main processor and memory. Accordingly, the increased density of memory devices may result in undesirable power consumption and reduced performance due to the distance between the system components.

SUMMARY

According to one embodiment of the present invention, a method for operating a memory device that includes memory and a processing element includes receiving, in the processing element, a command from a requestor, loading, in the processing element, a program based on the command, the program comprising a load instruction loaded from a first memory location in the memory, and performing, by the processing element, the program, the performing including loading data in the processing element from a second memory location in the memory. The method also includes generating, by the processing element, a virtual address of the second memory location based on the load instruction and translating, by the processing element, the virtual address into a real address.

According to another embodiment of the present invention, a system for memory operation includes a memory and a processing element, the system configured to perform a method including receiving, in the processing element, a command from a requestor, and loading, in the processing element, a program based on the command, the program including an instruction sequence loaded from a location in the memory. The method also includes loading, in the processing element, configuration information based on the command, the configuration information comprising information relating to virtual addresses and real addresses in the memory, and performing, by the processing element, the instruction sequence loaded into the processing element.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to operating an active buffered memory device. The active buffered device may be any suitable memory device including a plurality of memory elements (e.g., chips) connected to a logic portion and a processing element. In an embodiment, the active buffered memory device includes layers of memory that form a three dimensional ("3D") memory device where individual columns of chips form vaults in communication with the processing element and logic. The memory device may include a plurality of processing elements configured to communicate to the chips and other processing elements. In some embodiments, the active buffered memory device may comprise partitions that may be concurrently accessed by a plurality of processing elements, where the partitions may be any suitable memory segment, including but not limited to vaults. In an embodiment, a processing element accesses a selected address in a partition through an interconnect network. In addition, the interconnect network provides communication between processing elements on the memory device as well as between processing elements and a main processor. In an embodiment, each partition (e.g., vault) may have an associated memory controller or logic unit that is also coupled to the interconnect network.

Embodiments include an active buffered memory device that can perform a complex set of operations using multiple locations (e.g., data stored at specific addresses) within the memory device as operands. Further, a process is provided whereby the instructions and operations are performed autonomously on these operands within the memory device. Specifically, the instructions and operations are stored within the memory device itself and are not dispatched from a main processor, where the instructions stored in the memory device are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active buffered memory device is configured to load configuration information or instructions from a part of the active buffered memory device into a processing element following receiving a command from an external requestor, such as a main processor or another memory device. In addition, the processing element may perform virtual-to-real address translations that it computes while executing the loaded instructions. In an example, when performing a load instruction, the active buffered memory device accesses an operand from a memory location and places the operand in a register in the processing element. A virtual address of the memory location is generated by the load instruction and is translated into a real address by the processing element. Similarly, when performing a store instruction, the active buffered memory device writes a memory location with the contents (e.g., an operand) in a register in the processing element. A virtual address of the memory location is generated by the store instruction and is translated into a real address by the processing element.

Embodiments of the processing element in the memory device also have the ability to read or to write operands in any part of the memory device through the interconnect network. Specifically, a processing element may access other partitions (e.g., vaults) in the memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active buffered memory devices, where the interconnect network provides communication between processing elements and memory partitions of separate devices.

In one embodiment, the processing element is included with the memory controller as part of the stack. In addition, the processing element may perform complex arithmetic and logic operations on the operands read and write end results back to locations in memory. The active buffered memory device may return a single result value or signal to the main processor indicating that the results of the desired complex operation are ready in the memory device, thus performing the high bandwidth on the memory device and using a lower bandwidth communication between the memory device and main processor.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what is often quite simple calculations on the data, and then transferring the processed data back to memory, the system's main processor could configure the active processing elements within the active buffered memory device, and then instruct them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

In an embodiment, the active buffered memory devices include stateless processing elements within a memory cube. Processing elements appear to a program in the processor as long latency functional units. The processing elements themselves are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included are address translation capabilities for converting program virtual addresses to real addresses, a unified Load/Store Queue to sequence data movement between the memory and the processing elements, and a Processor Communications Unit, for communication with the main processor.

Figure 1:
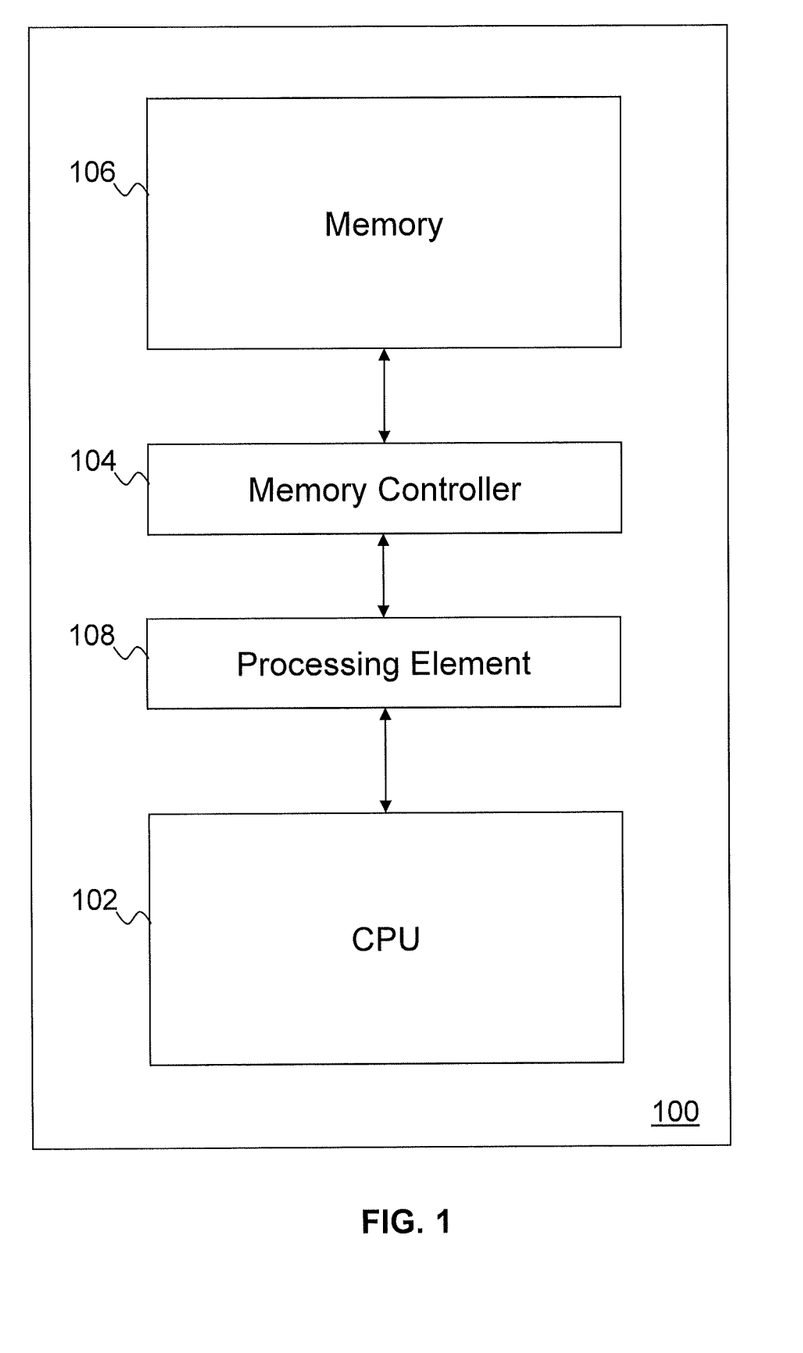
FIG. 1 illustrates a block diagram of a system for active buffered memory in accordance with an embodiment.

FIG. 1 illustrates a block diagram of a system for storing and retrieving data in a memory in accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written.

In an embodiment, the command from the computer processor 106 specifies a sequence of instructions that include setup actions, execution actions and notification of completion actions. The setup actions may include configuration actions described below in FIG. 2. The setup actions may also include the loading of code, such as a sequence of instructions, from the memory 106 into the processing element 108. The execution actions include execution of the code that includes load, store, arithmetic instructions, logical instructions, branch instructions, synchronization instructions, communication instructions and other instructions. Branch instructions are instructions that control a flow or order of execution, where a branch instruction may cause the operation to jump ahead or back to a selected instruction.

An exemplary synchronization instruction synchronizes operation of multiple processing elements. Executing such an operation on separate processing elements causes the memory updates of designated processing elements to complete before executing the next instruction in the instruction sequence in each of those processing elements. An exemplary communication instruction is one which signals back to the requestor (main processor, another memory device, etc) completion of the command initiated by the requestor. It could also be a request back from the processing element to the requestor for additional information needed to complete operation of the command, for example, a request for a specific mapping from a virtual address to a real address that was not provided by the original configuration operation.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

Figure 2:
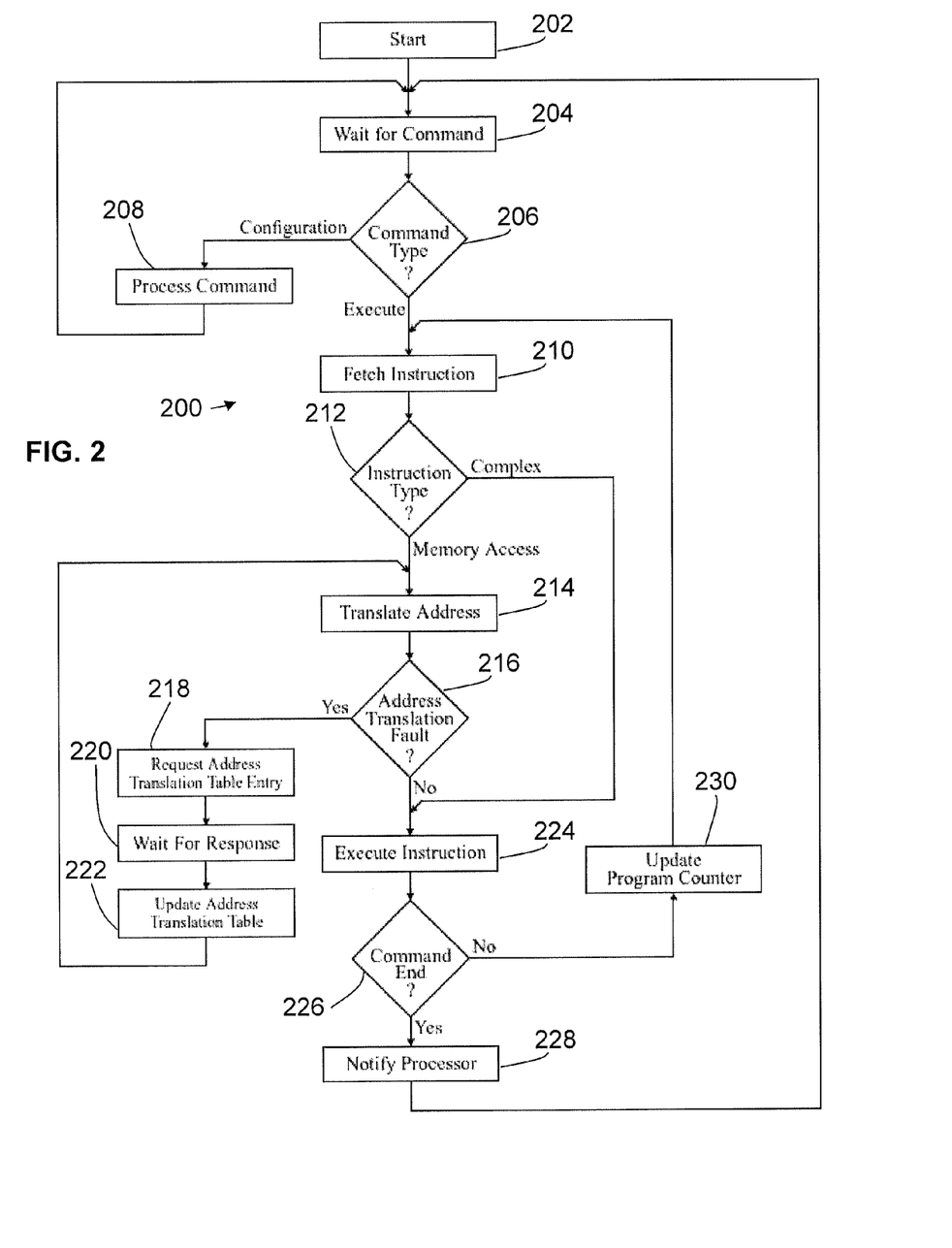
FIG. 2 illustrates a flow diagram of a method for operating a memory system with active buffered memory in accordance with an embodiment.

FIG. 2 is a flow chart 200 of an exemplary method and system for active buffered memory. The blocks may be performed by an active buffered memory device. For example, the blocks may be performed by a processing element in an active buffered memory device, where the processing element accesses portions of memory (e.g., memory vaults sharing a stack with the processing element) and performs operations on data accessed from the memory. The method starts at block 202, where a processing element in the active buffered memory device waits for a command in block 204. The command may be sent by a requestor to the memory device to perform one or more actions, where the requestor may be a main processor, a network interface, an I/O device or an additional memory device in communication with the processing element. In an embodiment, the command causes a program including one or more instructions to be loaded from within the memory, where the instructions may include load, store, arithmetic/logic operations or other instructions. In block 204, the command is received and the command type is determined in block 206, where the command type may be a configuration command or an execute command. In block 208, if the processing element receives a configuration command, it is processed by the processing element. The configuration command may be a command that loads configuration information from the memory within the memory device directly into the processing element. By providing the configuration information in the memory device, the processing element is able to be properly configured rapidly after receiving the command and then may be followed an execution command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). In an example, the information to maintain coherence includes information to ensure virtual-to-real address mapping in the processing element matches the virtual-to-real address mapping information accessed by the main processor for commands and control operations (e.g., a table in the main processor), thus providing improved accuracy when accessing data within the memory by the requestor. After the configuration command is processed in block 208, the processing element waits for a command in block 204.

Returning to block 206, if the command type is an execute command, the processing element fetches an instruction from memory within the memory device based on the command in block 210. The instruction may be loaded into an instruction buffer in the processing element. In embodiments, an instruction sequence based on the command is fetched. In an embodiment, the command specifies an instruction, where the command includes a portion of an instruction or operation as well as a pointer to instruction(s) to retrieve from within the memory device. In another embodiment, the command includes a pointer to the entire instruction(s) that is placed in the instruction buffer. By loading and executing the instruction(s) from within the memory device, the bandwidth needed to transmit the instructions to the main processor is reduced, due to transmission of the lower-bandwidth command, and latency for execution of the command is reduced. In block 212, the type of instruction to be executed is determined, where the instruction may be a complex instruction or a memory access instruction. If the instruction is a memory access instruction, an address translation takes place within the processing element in block 214. For a load instruction, where data is accessed and loaded from a memory location, the processing element generates a virtual address for the memory location and translates the virtual address into a real address to locate the data. For a store instruction, where data is written to a memory location, the processing element generates a virtual address for the memory location and translates the virtual address into a real address by the processing element prior to writing the data. In block 216, the processing element determines if there is a fault during address translation, such as an inconsistency between translation tables in the processing element and the main processor. In block 218, if there is a fault, the processing element requests an address translation table entry from the requestor, such as the main processor, to locate the correct address. In block 220, the processing element waits for a response to the entry request. In block 222, the address translation table in the processing element is updated with the correct information from the requested entry, thereby correcting the faulted data. In block 224, if there is no address translation fault or if the instruction type is complex (in block 212), the instruction is executed. Accordingly, the memory access or complex instruction is executed by the processing element, rather than a main processor, thus reducing latency for the operation by accessing, translating and performing an operation on data all proximate the memory. The complex instruction may include an arithmetic and/or logic operation performed on data accessed from the memory device. In block 226, the processing element determines if the command received in block 204 is complete. If the command is complete, the requestor is notified in block 228. If the command is not complete, a program counter is updated in block 230 to indicate the next instruction in the command to be fetched. In an embodiment, instructions in a sequence are executed in succession as indexed by the program counter.

In an embodiment, a plurality of commands are received in a plurality of processing elements and a plurality of instructions are loaded based on the plurality of commands, wherein each processing element is configured to load an instruction that accesses a memory partition (e.g., vault) concurrently while other memory partitions are accessed. Thus, commands may be executed concurrently by the processing elements to reduce latency and offload tasks from a computer system main processor. While one example depicts how the complex operation can be performed in response to a request from the main processor, the same can be achieved if the request is from any other requestor to which the active buffered memory is connected including a network, an I/O device, or even another memory device, including another active buffered memory device.

Figure 3:
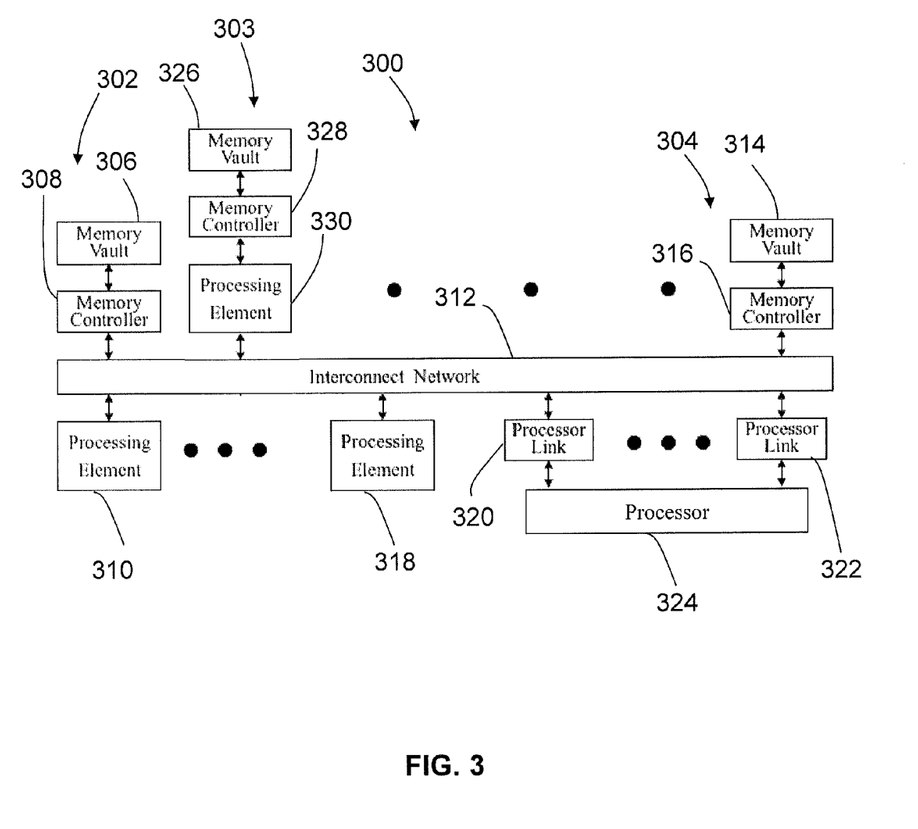
FIG. 3 illustrates a block diagram of a memory system with active buffered memory in accordance with an embodiment.

FIG. 3 is a schematic diagram of an embodiment of a computer system 300 implementing active buffered memory. In one embodiment, the computer system 300 includes an active buffered memory device 302, an active buffered memory device 303 and an active buffered memory device 304. The active buffered memory device 302 includes a memory vault 306, a memory controller 308 and a processing element 310. In an embodiment, the processing element 310, memory vault 306 and memory controller 308 are coupled and communicate via an interconnect network 312. Specifically, the processing element 310 communicates to the memory vault 306, memory controller 308 and other memory devices, such as active buffered memory devices 303 and 304, via the interconnect network 312. The interconnect network 312 is also coupled to a main processor 324 by processor links 320 and 322. The interconnect network 312 provides a fast and high bandwidth path for communication between portions of the device, such processing elements, memory controllers and memory, to provide improved performance and reduced latency for the active buffered memory.

The active buffered memory device 303 includes a memory vault 326, a memory controller 328 and a processing element 330. In an embodiment, the processing element 330, memory vault 326 and memory controller 328 are all located on the same side of the interconnect network 312, such as within a single stack. By positioning the processing element 330 in the same stack as memory vault 326, the latency is reduced when accessing locations in the memory vault 326, thus further improving performance. In one embodiment, the active buffered memory 304 includes a memory vault 314 and memory controller 316 coupled to processing elements 310 and processing element 318 via the interconnect network 312. As depicted, the processing element 318 is located on the other side of the interconnect network 312 from the memory controller 316 and memory vault 314. In embodiments, the active buffered memory devices 302, 303 and 304 include multiple layers of stacked addressable memory elements. Further, the stack's memory may be divided into memory vaults 306, 326 and 314, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 318, may be positioned on one side of the interconnect network 312 and may operate as a pool of processing elements that are available for accessing any memory in the memory system coupled to the interconnect network 312. The pooled processing elements are not limited to accessing a particular memory vault and, thus, one or more elements may be utilized upon receiving a command from the main processor 324. Accordingly, processing element 318 may be configured to access each memory vault 306, 326 and 314. In another embodiment, one or more processing elements, such as processing element 330, is located as part of a stack including a memory vault 326 and memory controller 328. In such a configuration, the processing element 330 is configured to access memory vault 326 coupled to the interconnect network 312, including memory vaults 306 and 314. In one embodiment, one or more processing element, such as processing element 310, is positioned on an opposite side of the interconnect network 312 from the memory vault 306 and memory controller 308. In the configuration, the processing element 310 is configured to access any memory coupled to the interconnect network 312, including memory vaults 326 and 314.

In an embodiment, the computer system may include a plurality of active buffered memory devices, such as the active buffered memory devices 302, 303 and 304. Further, each active buffered memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by external requestors, like the main processor, coupled to the interconnect network.

Figure 4:
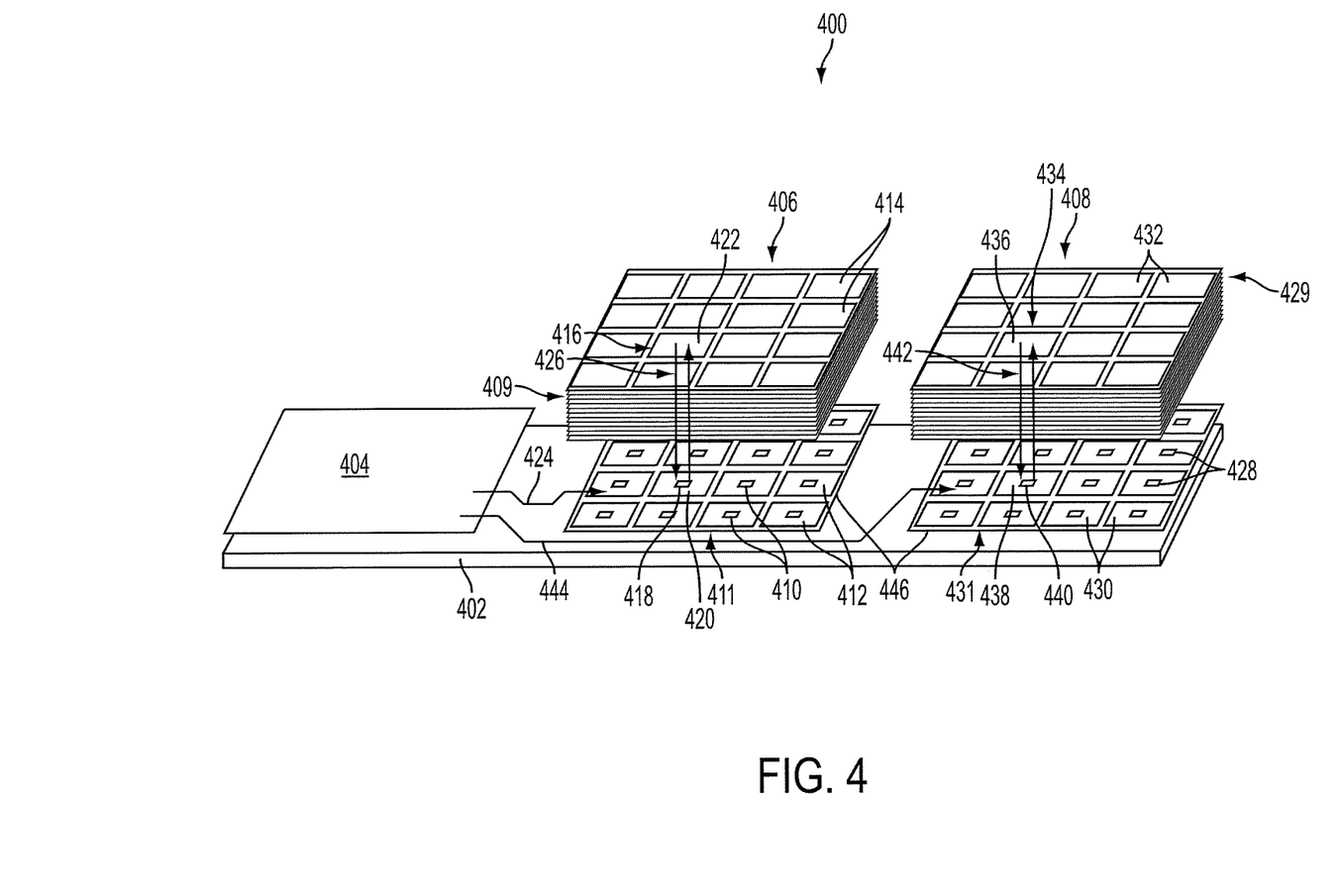
FIG. 4 illustrates a schematic diagram of a memory system with active buffered memory in accordance with an embodiment.

FIG. 4 is a diagram of an exemplary computer system 400 implementing active buffered memory. The computer system 400 includes a multi-chip module, silicon carrier or circuit board 402, a main processor 404, active buffered memory device 406 and active buffered memory device 408. The active buffered memory device 406, active buffered memory device 408 and main processor 404 are disposed on the circuit board 402. As depicted, portions of the active buffered memory devices 406 and 408 are exploded to show details of the computer system 400 arrangement. The active buffered memory devices 406 and 408 communicate to the main processor 404 via signal paths 424 and 444, respectively. As depicted, the active buffered memory device 406 is arranged in layers, where a base layer 411 includes a plurality of memory controllers 410 and processing elements 412. For example, the active buffered memory device 406 includes layers 409 of memory placed on top of the base layer 411, where the layers 409 each have a plurality of memory elements. As depicted, the base layer 411 also includes an interconnect network 446 to enable high bandwidth communication between memory, memory controllers and processing elements in the device.

In an embodiment, the active buffered memory device 406 includes a plurality of memory vaults 414, where each memory vault 414 includes a memory element from each layer 409, the memory vaults 414 positioned adjacent to memory controllers 410 and processing elements 412. Specifically, the exemplary active buffered memory device 406 includes layers of 16 memory elements, where the element layers form stacks, including a stack 416, where the stack 416 includes a memory vault 422 disposed above a memory controller 418 and a processing element 420. A high bandwidth communication path 426 provides a high bandwidth, direct and substantially reduced length (e.g., as compared to paths 424, 444) communication path between the processing element 420 and memory locations within the memory vault 422, thus reducing latency and power consumption for memory accesses. For example, the processing element 420 may receive a command from the main processor 404, load instructions from within the active buffered memory device 406 based on the command, and, as part of the loaded instructions, access data at a location in the memory vault 414 and perform a complex operation on the data in the processing element 420. Further, the processing element 420 may also store data, such as the result, in the memory vault 414 and transmit a value or signal to the main processor 404 following execution of the command. In an embodiment, the processing element stores or writes data (e.g. an operand) from a register in the processing element to the memory vault 414. The processing element 420 is also configured to translate addresses from virtual-to-real and real-to-virtual as part of the read or store operations. Thus, the processing element 420 provides instruction loading, address translation, complex operations and other tasks local to the memory to reduce latency, save power and free up the main processor 404 to perform other tasks.

Similarly, the active buffered memory device 408 includes a plurality of memory controllers 428 and processing elements 430 disposed on a base layer 431. In an embodiment, the active buffered memory 408 includes layers 429 of memory devices placed on top of the base layer 431, where the layers 429 each have a plurality of memory devices. The base layer 431 also includes an interconnect network 446 to enable high bandwidth communication between memory and processing elements in the device. In an embodiment, the interconnect networks 446 of active buffered memory device 406 and active buffered memory device 408 are coupled and allow communication between processing elements and memory on separate devices.

In an embodiment, the active buffered memory device 408 include a plurality of memory vaults 432, where each memory vault 432 includes a memory element from each layer 409, the memory vaults 432 positioned adjacent to memory controllers 428 and processing elements 430. The exemplary active buffered memory device 408 includes 16 stacks, including stack 434, where the stack 434 includes a memory vault 436 disposed above a memory controller 440 and a processing element 438. A high bandwidth communication path 442 provides communication between the processing element 430 and memory locations within the memory vault 436.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for operating an active buffered memory device that includes memory and a processing element, the method comprising:
   receiving, in the processing element, a command from a requestor;
   loading, in the processing element, a program based on the command, the program comprising a load instruction loaded from a first memory location in a memory vault, the memory of the active buffered memory device arranged in a plurality of layers forming the memory vault as a three-dimensional blocked region of the active buffered memory device, and the processing element in communication with the memory vault;
   performing, by the processing element, the program, the performing comprising loading data in the processing element from a second memory location in the memory vault of the active buffered memory device;
   generating, by the processing element, a virtual address of the second memory location based on the load instruction; and
   translating, by the processing element, the virtual address into a real address.

2. The method of claim 1, wherein loading, in the processing element, the program based on the command comprises loading an instruction sequence comprising the load instruction and an additional instruction, the additional instruction including an arithmetic operation or logic operation using data from the processing element and placing a result in the processing element.

3. The method of claim 1, comprising transmitting, from the processing element to the requestor, a value or a signal following execution of the command.

4. The method of claim 1, comprising loading a configuration based on the command, the configuration being loaded from within the memory.

5. The method of claim 4, wherein the configuration comprises address information to translate between virtual and real addresses and information to maintain coherence of memory between the processing element and the requestor.

6. The method of claim 1, wherein the requestor comprises a main processor, a network interface, an I/O device, or an additional active buffered memory device, configured to communicate with the active buffered memory device.

7. The method of claim 1, wherein the memory comprises memory partitions, wherein receiving, in the processing element, the command from the requestor comprises receiving in a plurality of processing elements a plurality of commands; and wherein loading, in the processing element, the instruction based on the command comprises loading a plurality of instructions based on the plurality of commands, wherein each processing element is configured to load an instruction that accesses a memory partition concurrently while other memory partitions are accessed.

8. The method of claim 7, wherein the memory partitions comprise memory controllers, each of the memory partitions comprising one of the memory controllers and a corresponding instance of the memory including the memory vault and the processing element, and wherein the memory controllers and plurality of processing elements communicate through an interconnect network.

9. The method of claim 1, the active buffered memory device further comprising an interconnect network, and wherein the memory comprises memory partitions as separate instances of the memory vault, wherein receiving, in the processing element, the command from the requestor comprises receiving in a plurality of processing elements a plurality of commands; and wherein loading, in the processing element, the instruction based on the command comprises loading a plurality of instructions based on the plurality of commands, wherein each processing element is configured to load an instruction that accesses a memory partition concurrently while other memory partitions are accessed wherein the memory partitions and plurality of processing elements communicate through the interconnect network.

10. The method of claim 1, wherein loading, in the processing element, the instruction based on the command comprises loading an instruction sequence comprising the instruction and at least one of: a branch instruction, a synchronization instruction and a communication instruction.

11. A method for operating an active buffered memory device that includes memory and a processing element, the method comprising:
   receiving, in the processing element, a command from a requestor;
   loading, in the processing element, a program based on the command, the program comprising a store instruction loaded from a first location in a memory vault, the memory of the active buffered memory device arranged in a plurality of layers forming the memory vault as a three-dimensional blocked region of the active buffered memory device, and the processing element in communication with the memory vault;
   performing, by the processing element, the program, the performing comprising storing data in the processing element to a memory location in the memory vault of the active buffered memory device;
   generating, by the processing element, a virtual address of the second memory location based on the store instruction; and
   translating, by the processing element, the virtual address into a real address.

12. The method of claim 11, wherein loading, in the processing element, the program based on the command comprises loading an instruction sequence comprising the store instruction and an additional instruction, the additional instruction including an arithmetic or logic operation using data from the processing element and placing a result in the processing element.

13. The method of claim 11, comprising transmitting, from the processing element to the requestor, a value or a signal following execution of the command.

14. The method of claim 11, comprising loading a configuration based on the command, the configuration being loaded from within the memory.

15. The method of claim 14, wherein the configuration comprises address information to translate between virtual and real addresses and information to maintain coherence of memory between the processing element and the requestor.

16. The method of claim 11, wherein the requestor comprises a main processor, a network interface, an I/O device, or an additional active buffered memory device, configured to communicate with the active buffered memory device.

17. The method of claim 11, wherein the memory comprises memory partitions, wherein receiving, in the processing element, the command from the requestor comprises receiving in a plurality of processing elements a plurality of commands; and wherein loading, in the processing element, the instruction based on the command comprises loading a plurality of instructions based on the plurality of commands, wherein each processing element is configured to load an instruction that accesses a memory partition concurrently while other memory partitions are accessed.

18. The method of claim 17, wherein the memory partitions comprise memory controllers, each of the memory partitions comprising one of the memory controllers and a corresponding instance of the memory including the memory vault and the processing element, and wherein the memory controllers and plurality of processing elements communicate through an interconnect network.

19. The method of claim 11, the active buffered memory device further comprising an interconnect network, and wherein the memory comprises memory partitions as separate instances of the memory vault, wherein receiving, in the processing element, the command from the requestor comprises receiving in a plurality of processing elements a plurality of commands; and wherein loading, in the processing element, the instruction based on the command comprises loading a plurality of instructions based on the plurality of commands, wherein each processing element is configured to load an instruction that accesses a memory partition concurrently while other memory partitions are accessed wherein the memory partitions and plurality of processing elements communicate through the interconnect network.

20. The method of claim 11, wherein loading, in the processing element, the instruction based on the command comprises loading an instruction sequence comprising the instruction and at least one of: a branch instruction, a synchronization instruction and a communication instruction.

21. A system for memory operation, the system comprising:
   a memory arranged in a plurality of layers forming a memory vault as a three-dimensional blocked region and a processing element, the system configured to perform a method comprising:
   receiving, in the processing element, a command from a requestor;
   loading, in the processing element, a program based on the command, the program comprising an instruction sequence loaded from a location in the memory vault;
   loading, in the processing element, configuration information based on the command, the configuration information comprising information relating to virtual addresses and real addresses in the memory vault; and
   performing, by the processing element, the instruction sequence loaded into the processing element.

22. The system of claim 21, wherein loading, in the processing element, the program comprising the instruction sequence comprises loading one of a store instruction and a load instruction.

23. The system of claim 21, wherein loading, in the processing element, the program comprising the instruction sequence comprises loading one of a store instruction and a load instruction, and loading at least one of: an arithmetic operation, a logic operation, a branch instruction, a synchronization instruction and a communication instruction.

24. The system of claim 21, comprising transmitting, from the processing element to the requestor, a value or a signal following execution of the command.

25. The system of claim 21, wherein the configuration information comprises address information to translate between virtual and real addresses and information to maintain coherence of memory between the processing element and the requestor.

26. The system of claim 21, wherein the requestor comprises a main processor, a network interface, an I/O device, or an active buffered memory device, configured to communicate with the memory.

27. The system of claim 21, wherein the memory comprises memory partitions, wherein receiving, in the processing element, the command from the requestor comprises receiving in a plurality of processing elements a plurality of commands; and wherein loading, in the processing element, the instruction based on the command comprises loading a plurality of instructions based on the plurality of commands, wherein each processing element is configured to load an instruction that accesses a memory partition concurrently while other memory partitions are accessed.

28. The system of claim 27, wherein the memory partitions comprise memory controllers, each of the memory partitions comprising one or more memory controllers and a corresponding instance of the memory including the memory vault and the processing element, and wherein the memory controllers and plurality of processing elements communicate through an interconnect network.

* * * * *